United States Patent
Kabelac et al.

(10) Patent No.: US 8,615,689 B2
(45) Date of Patent: *Dec. 24, 2013

(54) CORRECTING ERRORS IN LONGITUDINAL POSITION (LPOS) WORDS

(75) Inventors: William J. Kabelac, Morgan Hill, CA (US); Barry M. Trager, Yorktown Heights, NY (US); Shmuel Winograd, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/612,396

(22) Filed: Sep. 12, 2012

(65) Prior Publication Data

US 2013/0003213 A1    Jan. 3, 2013

Related U.S. Application Data

(63) Continuation of application No. 12/119,975, filed on May 13, 2008, now Pat. No. 8,271,857.

(51) Int. Cl.
*G11C 29/00* (2006.01)

(52) U.S. Cl.
USPC .......................................................... 714/711

(58) Field of Classification Search
USPC .......................................................... 714/771
See application file for complete search history.

(56) References Cited

U.S. PATENT DOCUMENTS

| | | | |
|---|---|---|---|
| 6,532,128 B1 | 3/2003 | Bui et al. | |
| 7,228,490 B2 * | 6/2007 | Ball et al. | 714/785 |
| 7,245,450 B1 * | 7/2007 | Cherubini et al. | 360/73.12 |
| 7,421,640 B2 * | 9/2008 | Cideciyan et al. | 714/771 |
| 7,813,070 B2 * | 10/2010 | Cideciyan et al. | 360/53 |
| 7,898,763 B2 | 3/2011 | Kabelac | |
| 7,957,088 B1 * | 6/2011 | Bui et al. | 360/76 |
| 7,957,089 B2 | 6/2011 | Kabelac | |
| 7,961,421 B1 * | 6/2011 | Bui et al. | 360/76 |
| 8,027,111 B2 * | 9/2011 | Cideciyan et al. | 360/39 |
| 2003/0116466 A1 | 6/2003 | Goto | |
| 2007/0044007 A1 * | 2/2007 | Cideciyan et al. | 714/785 |
| 2009/0207515 A1 | 8/2009 | Cideciyan et al. | |
| 2009/0237832 A1 | 9/2009 | Cherubini et al. | |
| 2009/0316296 A1 | 12/2009 | Cherubini et al. | |
| 2009/0316773 A1 | 12/2009 | Cideciyan et al. | |
| 2010/0232047 A1 | 9/2010 | Cherubini et al. | |
| 2011/0007413 A1 | 1/2011 | Cherubini et al. | |

* cited by examiner

*Primary Examiner* — Amine Riad
(74) *Attorney, Agent, or Firm* — Scully, Scott, Murphy & Presser, P.C.; Daniel P. Morris, Esq.

(57) ABSTRACT

A method for longitudinal position (LPOS) detection in a magnetic tape storage system for storing data upon linear tape open (LTO) magnetic storage tape, which data includes odd and even 36-bit LPOS words with error correcting ability. The method includes first encoding positional information onto the tape within the 36-bit LPOS words using each LPOS word's 8-bit sync mark field, and six of each LPOS word's 4-bit symbol fields, wherein 6 of 24 total bits comprise the encoded 8-bit sync mark field: Sy, and six 4-bit symbol fields are utilized as parity bits. The magnetic tape storage system passes the LTO magnetic storage tape encoded with the odd and even LPOS words with error correcting ability longitudinally across a servo reader/writer at a known speed, decoding the encoded positional information and detecting and correcting both ambiguous bits and single erroneous bit errors.

19 Claims, 7 Drawing Sheets

CORRECTING ERRORS IN LONGITUDINAL POSITION (LPOS) WORDS

CROSS REFERENCE TO RELATED APPLICATION

This application is a continuation of U.S. patent application Ser. No. 12/119,975, filed May 13, 2008, the entire content and disclosure of which is incorporated herein by reference.

BACKGROUND OF THE INVENTION

The present invention relates to tape storage systems, and more particularly relates to an addition of error correcting capability to longitudinal position (LPOS) words encoded in the servo band of storage tapes, and a storage tape system and method of use that utilize the LPOS words with error correcting capability.

Tape storage systems for storing digital data, e.g., backup, are known. Tape storage systems provide an efficient, high capacity, cost-effective and reliable means for data backup. Linear Tape-Open (LTO) technology has developed through an effort to maximize capacity and performance of tape storage systems. LTO tapes use a tape format that includes longitudinally pre-written servo bands. The servo bands provide a timing-based band-following tape position error scheme. That is, the servo frames are encoded as LPOS words to provide the longitudinal position down the length of the tape. During operation, the servo band identification (ID) is identified by measuring the "phase" lead or lag between adjacent servo bands using start positions of servo frames.

In more detail, each servo band contains a repeated pattern of recorded flux transitions that occur in grouped bursts of 5, 5, 4 and 4 transition pairs. Each transition pair is referred to as a stripe and a grouping of 18 stripes is referred to as a frame. The timing (i.e., phase) between the sets of 5 bursts and 4 bursts provide the position information for band following. Select transition pairs within each of the 5 burst sets are phase-shifted to encode longitudinal position information (LPOS) into the server band. By detecting then decoding the phase encoded LPOS information, a tape storage system is able to determine the tape position relative to the landmarks lengthwise down the tape. The LPOS data are used as primary positional information for the tape servo control system to determine the starting and stopping of a tape, and to back-hitch the tape in order to position the read-write heads at the beginning of a data record at the required velocity and band position that allows the start of a new data transfer operation.

LPOS data typically cannot tolerate error. If a tape drive is reduced to a single channel because other servo heads have been smeared, or shorted, a single bit error on that channel can cause a stop write condition. For that matter, conventional LPOS words used on LTO tape storage schemes are not provided with error-correcting capabilities. As such, a single bit error in any one of the Sy, or L0...L5 symbols could result in a stop write condition. In conventional tape storage operation, the likelihood that a single bit error can occur increases significantly if one servo head is not working, further increasing the possibility of stop write conditions.

Solutions have been attempted to reduce errors in LPOS words such as appending Reed-Solomon parity symbols to an LPOS word. Appending Reed-Solomon parity symbols, however, increases LPOS word length undesirably. Adding a base-14 checksum in an attempt to minimize error is also known, which adds a capability to identify, but not to correct errors. Another known solution is found in commonly-owned US Patent Application Publication No. US 2007/0044007, filed Aug. 17, 2005 (the '007 application), which teaches an LTO-based tape storage system and method, which provide error correction capability by initially encoding LPOS data via a set of even LPOS words, and a set of odd LPOS words. The encoded data comprising the sets of odd and even LPOS words are decoded by generating a set of syndrome bits for each of the LPOS words, and a determination is made as to whether there is error present in any one of the LPOS words based on its corresponding syndrome bits.

The most significant bit within each LPOS word symbol is encoded into a server sub-frame, such that an LPOS word containing 36 bits have a length of 36 servo frames. The LPOS words comprise Sy, L0, L1, L2, L3, L4, L5 and TX. In accordance with the '007 application, even LPOS words comprise Sy, L0, L1, L2, L3, X, Y, Tx, where L0 is 0, 2, ..., 12, and odd LPOS words comprise Sy, L0, L1, L4, L5, X, Y and Tx, where LO is 1, 3, ..., 13. There is no error in a particular LPOS word if a syndrome bit sum of the one LPOS word equals 0 or 1, and a single bit error if the sum equals 3. There is more than a single bit error if the syndrome bit sum of the LPOS word is 2-6.

The error correcting ability resides in the use of L4, L5 for even words and the use of L2, L3, for odd words used for X,Y, which are 8 bits of (d=0, k=3) run length-limited (RLL) constrained error correction code encoded as a, b, c, 1, d, e, f, 1, where a, b, c, d, e and f are six parity bits associated with a shortened extended Hamming code. The solution presented, however, is not ideal. To implement same requires a considerable modification of existing server encode-decode electronic circuits, and does not address effective error correction for ambiguous bits. Moreover, the known solution fails to safeguard or protect the sync mark symbol, Sy, the first symbols comprising each LPOS word, utilized to determine the beginning of an LPOS word. Nor is the known system able to add servo band ID information to each LPOS word.

SUMMARY OF INVENTION

To that end, the present invention discloses a novel and non-obvious LTO tape storage system, and method for using same, that implements novel LPOS word encoding and decoding to implement error-correcting capabilities that overcome the shortcomings of the known LPOS-based systems.

The inventive system and method with the LPOS error-correcting capabilities is constructed to display the following properties:

1. Information currently required in a conventional LPOS word remains available in the novel LPOS words with error-correcting capabilities.

2. The novel LPOS words with error-correcting capabilities do not increase the length of the LPOS word.

3. The novel LPOS words with error-correcting capabilities and their implementation in the inventive system has minimal impact to required conventional servo decode electronic circuits.

4. That a sequence 10000000 appears only at the sync mark field Sy, and nowhere else in the LPOS word with error-correcting capabilities.

5. That any errors found in the whole LPOS word, except for the symbol Tx, are correctable, and are corrected.

6. That the use of LPOS words with error-correcting capabilities protect both ambiguous bits and erroneous bits.

7. That the error-correcting capabilities of the LPOS words incorporate information about the number of the Servo Band.

The invention includes adding an LPOS word error-correcting code, and rearranging information in its conventional format within the LPOS word so that address information is obtained from two words, either read sequentially or simultaneously. The error-correcting code provides the capability to correct a single erroneous bit, detect two erroneous bits, and identify values of ambiguous bits, and if needed. By writing even and odd LPOS words in accordance with the invention obviates any need for "priming," such that the LPOS decoder circuitry may be eliminated in an LTO system constructed to utilize the novel tape and capability for correcting errors in the LPOS words written to the tape.

In one embodiment, the invention includes a linear tape open (LTO) storage tape comprising odd and even 36-bit LPOS words including capability for identifying and correcting erroneous and ambiguous bit errors, the odd and even LPOS words arranged and encoded on the LTO storage tape with tape position information without increasing the 36-bit length of the coded word, the encoded LPOS words comprising:

a sync mark field, Sy, where Sy=10000000 bits;

six (6) 4-bit (bbbb) symbol fields, L0, L1, L2, L3, L4 and L5; and a 4-bit (bbbb) manufacturer's filed Tx;

wherein the tape position information encoded into the LPOS words on the LTO storage tape enables efficient decoding of address information by reading two of the coded LPOS words: 1) without servo band number and positioned sequentially in a servo band, or 2) with servo band number and positioned in separate servo bands, simultaneously;

wherein single erroneous bit errors present in the sync mark field Sy, and the six 4-bit symbol fields, L0, L1, L2, L3, L4, and L5, are detectable and correctable, wherein two erroneous bit errors are detectable; and wherein ambiguous bits are determinable.

In another embodiment, the invention includes a method for longitudinal position (LPOS) detection in a magnetic tape storage system for storing data upon linear tape open (LTO) magnetic storage tape, which data includes odd and even 36-bit LPOS words with error correcting ability. The method includes steps of encoding positional information onto the magnetic storage tape within the odd and even 36-bit LPOS words using each LPOS word's 8-bit sync mark field, Sy, and six of each LPOS word's 4-bit symbol fields, L0, L1, L2, L3, L4, and L5, wherein 6 of 24 total bits comprising the encoded 8-bit sync mark field: Sy, and six 4-bit symbol fields: L0, L1, L2, L3, L4, and L5 are utilized as parity bits, operating the magnetic tape storage system by passing the LTO magnetic storage tape encoded with the odd and even LPOS words with error correcting ability longitudinally across a servo reader/writer at a known speed, decoding the encoded positional information by reading either two words sequentially or two words simultaneously, the simultaneous reading requiring that the LPOS words include servo band numbers and detecting and correcting both ambiguous bits and single erroneous bit errors.

In yet another embodiment, the invention includes a magnetic tape storage system for storing and retrieving digital data in a form of 36-bit longitudinal position (LPOS) words with error correcting ability positioned on a linear tape open (LTO) magnetic storage tape, wherein said LPOS words with error correcting ability are arranged on the magnetic storage tape in servo bands and encoded with tape positional information. The tape storage system includes an encoder for encoding the positional information into the LPOS words using an 8-bit sync mark field Sy, and six 4-bit symbol fields, L0, L1, L2, L3, L4, and L5, wherein 6 of 32 bits comprising combined sync mark and 4-bit symbol fields Sy, L0, L1, L2, L3, L4, and L5, are encoded as parity bits, a tape reader-writer, for writing the encoded LPOS words to the tape, and reading the encoded LPOS words from the tape during tape storage system operation and a decoder for decoding Sy, L0, L1, L2, L3, L4, and L5, from LPOS words read from the tape, the decoder identifying a location of single bit error, double bit error and ambiguous bits therein. Each LPOS word is encoded as even or odd to support the error correcting ability. If the even and odd LPOS words are encoded to include a servo band number, address information is decoded from said odd and even LPOS words by reading the encoded LPOS words in two servo bands simultaneously, and if the even and odd LPOS words are encoded without servo band number, address information is decoded by reading two successive encoded LPOS words.

BRIEF DESCRIPTION OF THE DRAWING FIGURES

The foregoing and other objects, aspects and advantages will be better understood from the following detailed description of embodiments of the inventions, with reference to the drawings, in which.

DETAILED DESCRIPTION OF THE INVENTION

The inventive coded LPOS Words, LTO tape storage system incorporating the coded LPOS words, and method of operating an LTO tape storage system using the coded LPOS words as set forth and described herein is disclosed for the purpose of conveying the broad inventive concept. In particular, the drawings and descriptions provided are not meant to limit the scope and spirit of the invention in any way as claimed in the claim set appended hereto. To that end, reference will now be made in detail to the present invention, examples of which are illustrated in the accompanying drawings, wherein like reference numerals refer to like elements throughout.

Figure 1:
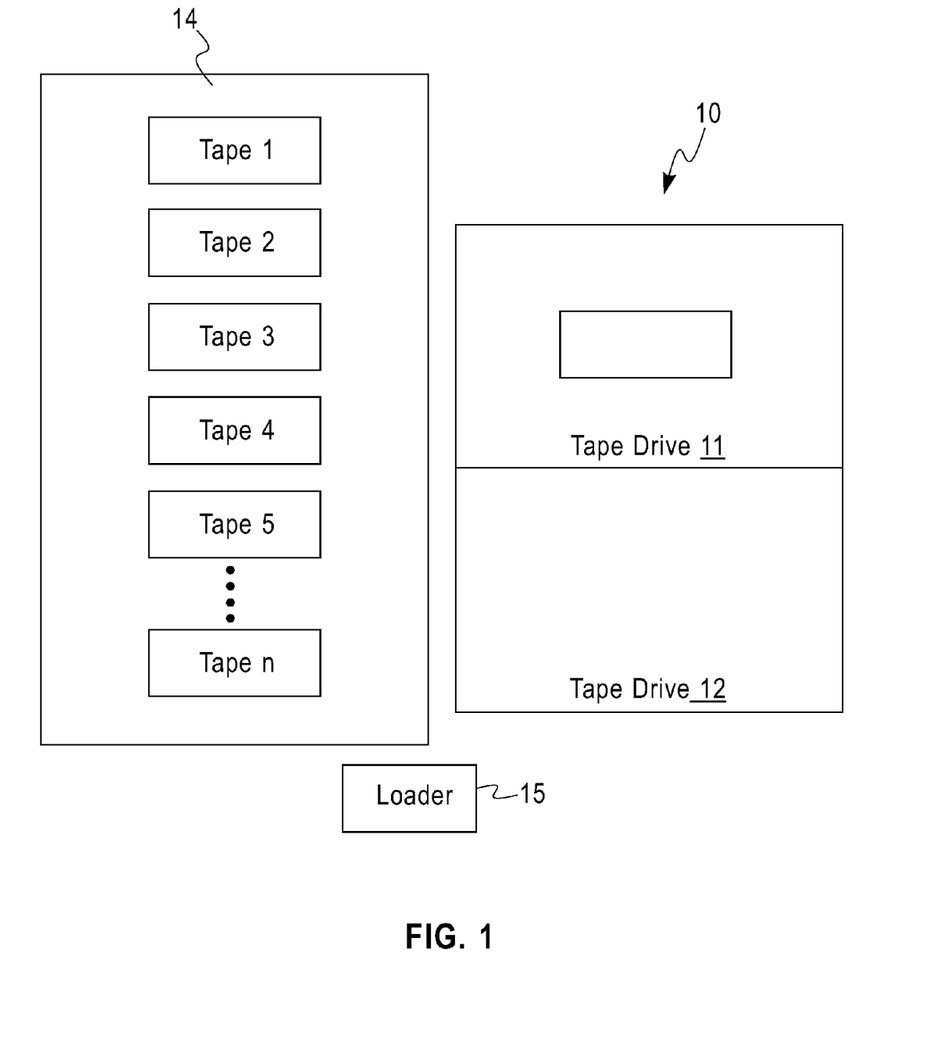
FIG. 1 is a block diagram of a tape library system in which a preferred embodiment of the present invention can be incorporated.

Referring now to the drawings, and specifically to FIG. 1, there is depicted a tape library system (10) in which storage tape that includes the novel LPOS word error correcting capability of the invention can be incorporated. The tape library system (10) includes tape drives (11), (12), a loader (15), and a library of tape cassettes (or cartridges) (14). Loader (15) can fetch any one of tape cassettes (14) and loads it into one of tape drives (11), (12).

Figure 2:
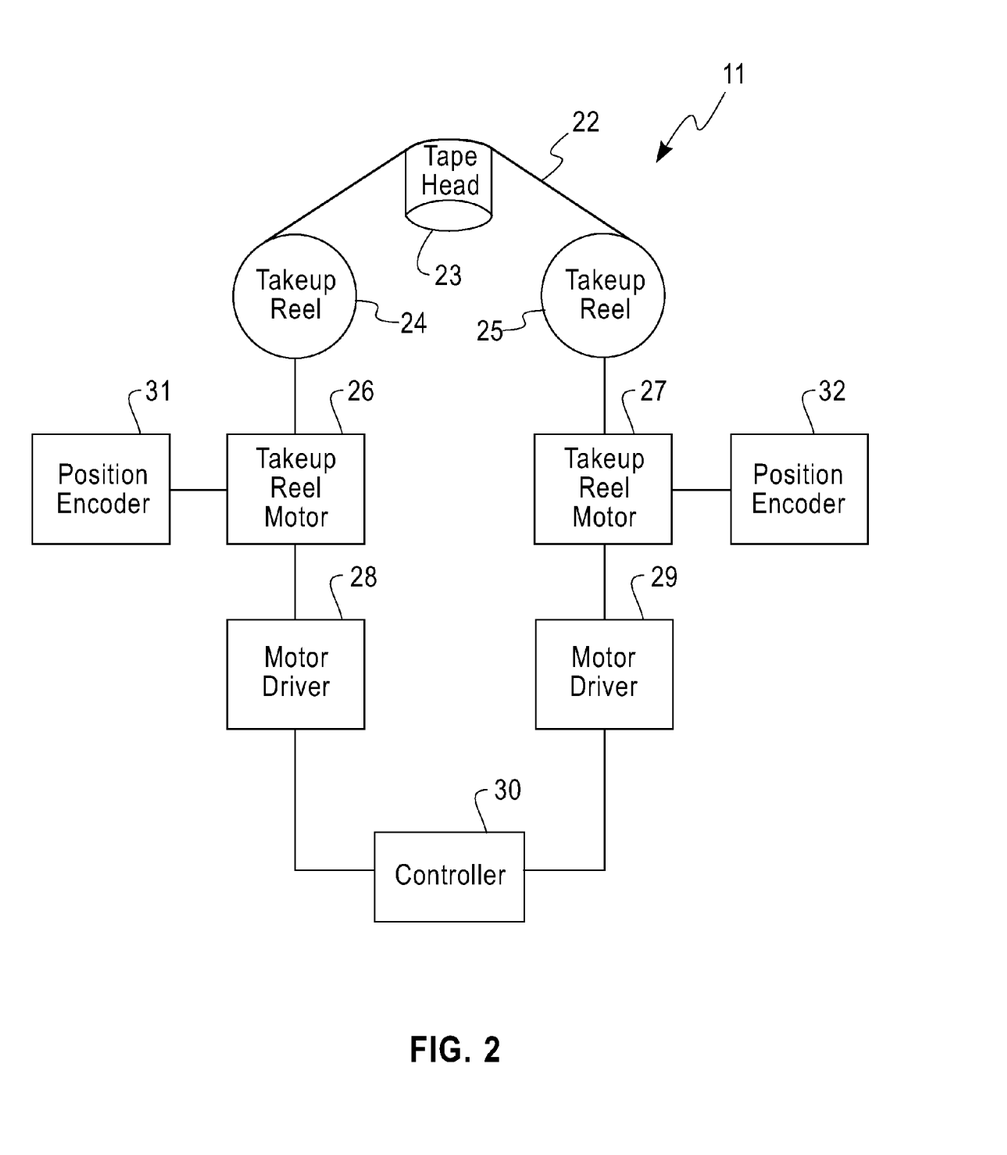
FIG. 2 is a block diagram of a tape drive in which a preferred embodiment of the present invention can be incorporated.

FIG. 2 depicts tape drive (11), in which a storage tape (22) that includes the novel LPOS word error correcting capability of the invention may be incorporated. As shown, tape drive (11) includes a tape read/write head (23), take-up reels (24), (25) and take-up reel motors (26), (27). Magnetic tape (22) is spooled on take-up reels (24), (25), and is routed over tape read/write head (23). Tape read/write head (23) reads data from and writes data to magnetic tape (22). Take-up reel motors (26), (27) control the positioning of magnetic tape (22) over tape read/write head (23) via take-up reels (24), (25), respectively.

In addition, a controller (30) provides control signals to motor drivers (28), (29). Motor drivers (28), (29), in turn, provide drive signals to take-up reel motors (26), (27), respectively. Position encoders (31), (32) commutates take-up reel motors (26), (27), respectively. Longitudinal position (LPOS) information are used to cause controller (30) to move magnetic tape (22) over its entire length, to rewind from the tape end (not shown) to the tape beginning (end, not shown), and unspool, unthread, etc.

Figure 3:
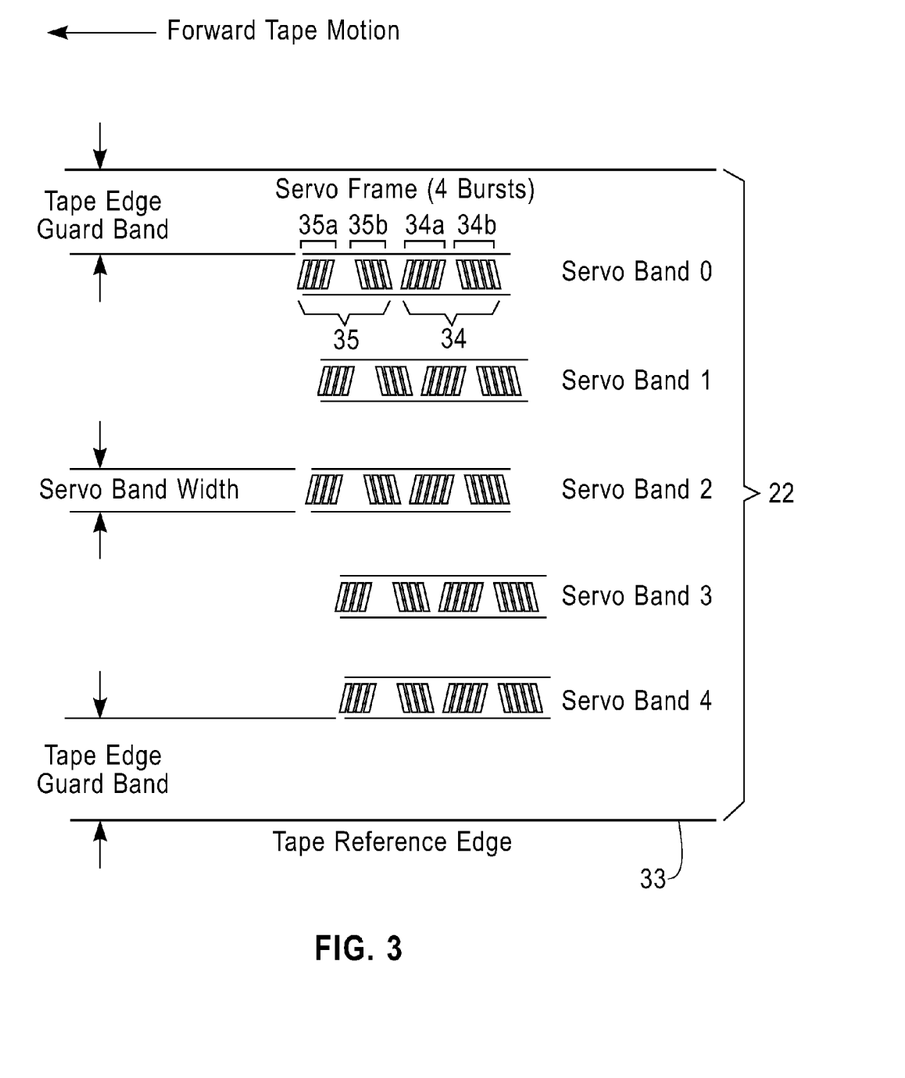
FIG. 3 illustrates a recording format on a magnetic tape, in accordance with a preferred embodiment of the present invention.

Referring now to FIG. 3, there is illustrated a recording format on a magnetic tape, such as magnetic tape (22) from FIG. 2, in accordance the invention. As shown, magnetic tape (22) includes servo bands 0-4 to enable an accurate positioning of a tape read/write head over a data track, and to ensure that the tape read/write head does not stray onto an adjacent data track. Servo bands 0-4 are written on magnetic tape (22) at time of manufacture. Each of servo bands 0-4 is located at a specific distance from a tape reference edge (33). Within each of servo bands 0-4 are servo stripes, groups of which make up servo bursts. Four servo bursts make up a servo frame. For example, in servo band 0, a servo frame includes subframes (34), (35), comprising servo bursts (34a), (34b), (35a), (35b).

First two servo bursts (34a), (34b), contain five flux transition pairs, and second two servo bursts (35a), (35b), contain four flux transition pairs. For each new LPOS word sequence, a tape drive needs to first read two LPOS words consecutively in order to fully land a seek position since L0, L1, L2, L3, L4, and L5 are required. But after the first two LPOS words (i.e., L2 through L5) are known and can be updated, only one LPOS word is then required for subsequent updates.

Figure 4:
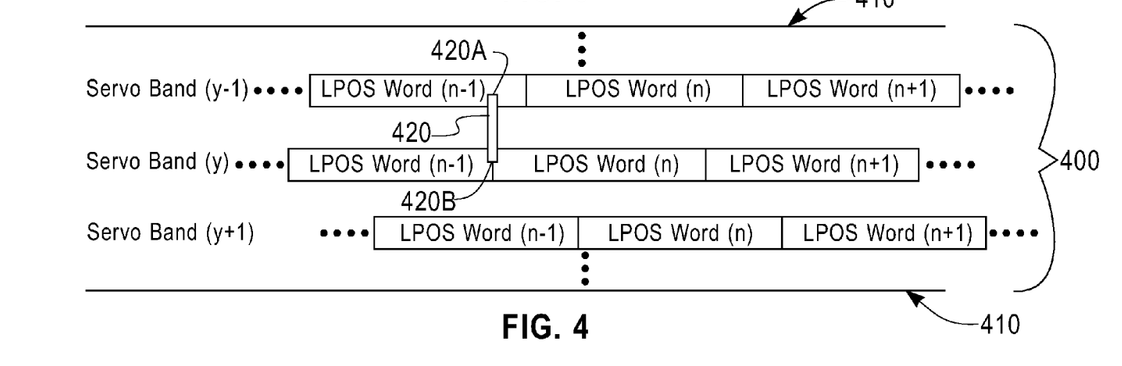
FIG. 4 is a schematic representation of a portion of an LPOS tape as known in the prior art.

Referring now to FIG. 4, a portion of an LTO storage tape (400) is shown, the tape boundaries of which are identified therein as tape edges 410. Each of Servo Bands (y−1), (y) and (y+1) are located at a specified, fixed distance from a tape edge (410). For each Servo Band, an LPOS Word (n−1), (n) and (n+1) is encoded at the longitudinal tape position (i.e., tape portion). During tape storage system operation, servo/data head assembly (420) reads the LPOS words in Servo Band (y−1) and Servo Band (y) using servo/data read heads (420A) and (420B), respectively.

Figure 5:
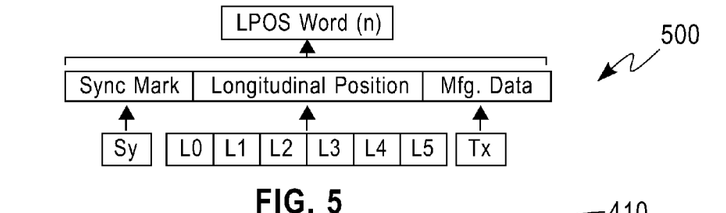
FIG. 5 is a schematic representation of a known prior art LPOS word (n), such as an LPOS word depicted in FIG. 4.

FIG. 5 shows specific details of an LPOS word (n) (500), found in any of the Servo Bands (y−1), (y) and (y+1) of FIG. 4. The LPOS words store the absolute location down the (horizontal) length of the tape (400, FIG. 4). Each LPOS word is recorded on a tape in a form Sy L0 L1 L2 L3 L4 L5 Tx, as shown, where Sy=the sync mark field=10000000; L0, L1, L2, L3, L4, and L5 designate the absolute location. L0, L1, L2, L3, L4, and L5 are each 4-bit symbols, which may be one of 14 possible values (base 14). Tx is a 4-bit symbol provided by the manufacturer, which may be one of 14 values (base 14).

To operate in accordance with the inventive principles, the system is configured to define the information content for each LPOS word, including the novel error correcting capabilities, in accord with the limitations based on the seven (7) properties stated above. In more detail, once the LPOS word content is defined to include the error correcting capability, the LPOS word is then encoded and written into the servo bands of the storage tape for use with the inventive system. During system operation, when the tape is read and the LPOS words decoded, any errors in the LPOS data found in the stored data thereon are readily corrected. If an identified error is uncorrectable, the decoder detecting the uncorrectable error issues a stop write command.

Figure 6:
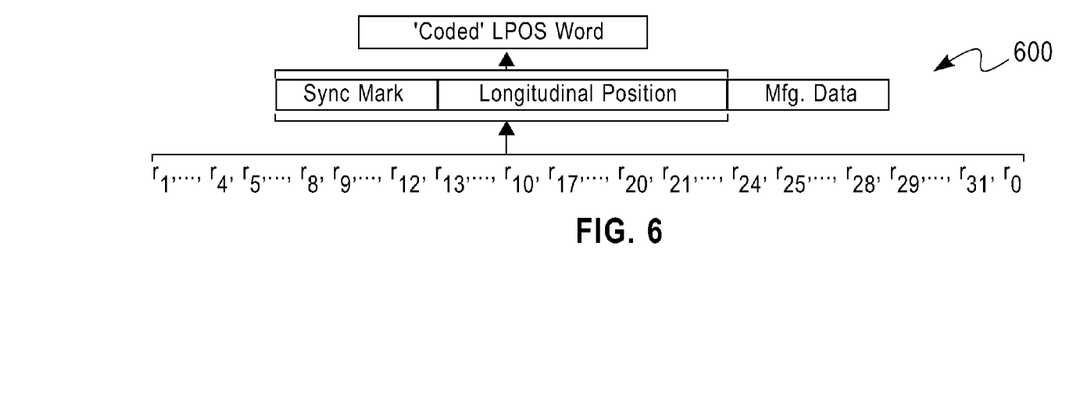
FIG. 6 is a schematic representation of a "coded" LPOS word, encoded in accordance with the spirit of the invention.

As used herein, an LPOS word with error correcting capability of the invention is 36 bits long. Of those 36 bits, 8 are used for the sync symbol, Sy, four for symbol TX, and 24 for L0, L1, L2, L3, L4 and L5. To avoid confusion, the 32 bits comprising Sy, L0, L1, L2, L3, L4 and L5 willed be referred to herein as the 'Coded' LPOS word (600), as shown in FIG. 6. The 32 bits start on the far left of FIG. 6, designated as bits number $r_1, r_2, r_3, \ldots r_{30}, r_{31}, r_0$ (notice that $r_0$ comes after $r_{31}$). During operation, 5 bits are used as the binary representation of each bit position. In the following, the decoder is described first, then the encoder followed by the information contained in and represented by the novel LPOS words with error correcting ability of the invention.

The Decoder:

The conventional servo read head (420A; FIG. 4) reads a 32 bit 'Coded' LPOS word such as coded LPOS word (600) of FIG. 6. Such coded LPOS word (600) may be corrupted by errors, or may include ambiguous bits (the 32-bit "Coded" LPOS word is: $r_1, r_2, \ldots r_{31}, r_0$). Each of the $r_i$'s is 0, 1, or 'a' (which stands for ambiguous). Ambiguous bits are set to 0, and their location is remembered (kept). Decoding operation is initiated by computing two syndromes. A first syndrome, $S_0$, is one bit, and the second syndrome, $S_1$, is five bits.

$$S_0 = \oplus r_i = r_1 \oplus r_2 \oplus \ldots \oplus r_{31} \oplus r_0, \text{ and}$$

$$S_1 = \oplus i \; r_i; \text{ where i is the binary representation of vector}_i$$

$S_1$ is obtained by taking all the $r_i$'s which have the value 1, and XOR-ing them. If we denote $S_1$ by $(S_1(0), S_1(1), S_1(2), S_1(3), S_1(4))$ then, $$S_1(0) = r_1 \oplus r_3 \widetilde{\phantom{r}} r_5 \widetilde{\phantom{r}} r_7 \widetilde{\phantom{r}} r_9 \widetilde{\phantom{r}} r_{11} \widetilde{\phantom{r}} r_{13} \widetilde{\phantom{r}} r_{15} \widetilde{\phantom{r}} r_{17} \widetilde{\phantom{r}} r_{19} \widetilde{\phantom{r}} r_{21} \widetilde{\phantom{r}} r_{23} \widetilde{\phantom{r}} r_{25} \widetilde{\phantom{r}} r_{27} \widetilde{\phantom{r}} r_{29} \widetilde{\phantom{r}} r_{31}$$

$$S_1(1) = r_2 \oplus r_3 \widetilde{\phantom{r}} r_6 \widetilde{\phantom{r}} r_7 \widetilde{\phantom{r}} r_{10} \widetilde{\phantom{r}} r_{11} \widetilde{\phantom{r}} r_{14} \widetilde{\phantom{r}} r_{15} \widetilde{\phantom{r}} r_{18} \widetilde{\phantom{r}} r_{19} \widetilde{\phantom{r}} r_{22} \widetilde{\phantom{r}} r_{23} \widetilde{\phantom{r}} r_{26} \widetilde{\phantom{r}} r_{27} \widetilde{\phantom{r}} r_{30} \widetilde{\phantom{r}} r_{31}$$

$$S_1(2) = r_4 \oplus r_5 \widetilde{\phantom{r}} r_6 \widetilde{\phantom{r}} r_7 \widetilde{\phantom{r}} r_{12} \widetilde{\phantom{r}} r_{13} \widetilde{\phantom{r}} r_{14} \widetilde{\phantom{r}} r_{15} \widetilde{\phantom{r}} r_{20} \widetilde{\phantom{r}} r_{21} \widetilde{\phantom{r}} r_{22} \widetilde{\phantom{r}} r_{23} \widetilde{\phantom{r}} r_{28} \widetilde{\phantom{r}} r_{29} \widetilde{\phantom{r}} r_{30} \widetilde{\phantom{r}} r_{31}$$

$$S_1(3) = r_8 \oplus r_9 \widetilde{\phantom{r}} r_{10} \widetilde{\phantom{r}} r_{11} \widetilde{\phantom{r}} r_{12} \widetilde{\phantom{r}} r_{13} \widetilde{\phantom{r}} r_{14} \widetilde{\phantom{r}} r_{15} \widetilde{\phantom{r}} r_{24} \widetilde{\phantom{r}} r_{25} \widetilde{\phantom{r}} r_{26} \widetilde{\phantom{r}} r_{27} \widetilde{\phantom{r}} r_{28} \widetilde{\phantom{r}} r_{29} \widetilde{\phantom{r}} r_{30} \widetilde{\phantom{r}} r_{31}$$

$$S_1(4) = gr_{16} \widetilde{\phantom{r}} r_{17} \widetilde{\phantom{r}} r_{18} \widetilde{\phantom{r}} r_{19} \widetilde{\phantom{r}} r_{20} \widetilde{\phantom{r}} r_{21} \widetilde{\phantom{r}} r_{22} \widetilde{\phantom{r}} r_{23} \widetilde{\phantom{r}} r_{24} \widetilde{\phantom{r}} r_{25} \widetilde{\phantom{r}} r_{26} \widetilde{\phantom{r}} r_{27} \widetilde{\phantom{r}} r_{28} \widetilde{\phantom{r}} r_{29} \widetilde{\phantom{r}} r_{30} \widetilde{\phantom{r}} r_{31}$$

Once $S_0$ and $S_1$ are computed, the following is implemented by further processing:

1. If $S_0=0$, and $S_1=0$, no error was detected, and the ambiguous bits remain 0.

2. If no ambiguous bit is detected, check to determine if $S_0=1$. If $S_0=1$, the value of the bit in position $S_1$ is changed. If $S_0=0$, and, therefore, $S_1$ is not 0, then there is uncorrectable error.

3. If one ambiguous bit error is detected, for example, an ambiguous bit error in position p, if $S_0=0$, then position p is set to 1, and change the value of the bit in position $S_1\bar{=}p$. But if $S_0=1$, then change the position of position p to 1 whenever $S_1=p$, otherwise change the value of the bit in position $S_1$.

4. If there were two ambiguous errors, for example, in positions p and q, if $S_0=0$, then the bits at positions p and q are set to 1 when $S_1=p\bar{\sim}q$, otherwise, the two ambiguous errors are uncorrectable error; if $S_0=1$, then the bit at position p is set to 1 when $S_1=p$, and the bit at position q is set to 1 when $S_1=q$; otherwise, there is uncorrectable error.

5. If there were 3 or more ambiguous bits, the error is uncorrectable. In accordance with the inventive principles, the decoder declares 3 detected ambiguous bits as an uncorrectable error because if three ambiguous errors occurred, for example, in positions p, q, and t, then an erroneous bit at the position $u=p\bar{\sim}q\bar{\sim}t$ may cause the decoder to miscorrectly decode. In many circumstances, when the probability that an ambiguous bit is greater than the probability of an erroneous bit, the inventive processing assumes the bits are ambiguous, not incorrect, and corrects the three ambiguous bits. To do so the decoder implements a modified version of the above described decoding. That is, the first four steps are as described above, but the decoder replaces step (5) with:

5'. If there were three ambiguous bits, for example, in positions p' q' and t, and if $S_0=0$, then the bits in positions p and q are set to 1 where $S_1=p\bar{\sim}q$; the bits in positions p and t are set to 1 if $S_1=p\bar{\sim}t$; and the bits in positions q and t are set to 1 if $S_1=q\bar{\sim}t$; otherwise, the error is identified as uncorrectable error.

But if $S_0=1$, then the bit in position p is to 1 if $S_1=p$; the bit in position q is set to 1 if $S_1=q$; the bit in position t is set to 1 if $S_1=t$; and the bits in positions p, q, and t are set to 1 if $S_1=p\bar{\sim}q\bar{\sim}t$; otherwise, the error is identified as uncorrectable error.

6'. If four or more ambiguous bits occurred, it is determined that there is uncorrectable error.

The Encoder:

The novel encoder arranges the 26 information bits, and the 6 check bits as follows:

$d_1, d_2, \ldots, d_8, c_9, c_{10}, c_{11}, c_{12}, d_{13}, d_{14}, \ldots, d_{29}, d_{30}, c_{31}, c_0$.

The position of these bits within the 'coded' LPOS word was described above in FIG. 3, where: $d_1, \ldots, d_8=r_1, \ldots, r_8$, $c_9, \ldots, c_{12}=r_9, \ldots, r_{12}$, etc. The novel encoder determines the values of the six check bits $c_9, c_{10}, c_{11}, c_{12}, c_{31}, c_0$ by first computing two pseudo syndromes $S'_0$ (which is one bit), and $S'_1=(S'_1(0), S'_1(1), S'_1(2), S'_1(3), S'_1(4))$ (which is five bits). The two pseudo syndromes are computed as follows:

$S'_0 = \bar{\sim} d_i$, and $S'_1 = \bar{\sim} i\, d_i$, where the 'summation' is carried out only over the information bits.

Then, the following are computed:

$c_9 = S'_1(1)\bar{\sim}S'_1(2)\bar{\sim}S'_1(3)\bar{\sim}S'_1(4)$ $c_{10} = S'_1(0)\bar{\sim}S'_1(2)\bar{\sim}S'_1(3)\bar{\sim}S'_1(4)$ $c_{11} = S'_1(0)\bar{\sim}S'_1(1)\bar{\sim}S'_1(2)\bar{\sim}S'_1(3)$ $c_{12} = S'_1(2)\bar{\sim}S'_1(4)$ $c_{31} = S'_1(4)$ and $c_0 = S'_0 \bar{\sim} S'_1(3)$ Information on the LPOS Words:

Each LPOS word is either even or odd, as mentioned above. The inventive system and method requires information from both an even LPOS word, and an odd LPOS word to decode the full address of the tape location ("coded" LPOS word position). The invention is constructed to encode the information comprising the LPOS words in two alternative modes of operation. The first mode of encoding operation does not include (encode) the number of the Servo Band, and so requires reading two successive LPOS words to encode the information (and two successive LPOS words must be decoded to read the information).

The first mode of operation has the advantage that all the Servo Bands with the same address have the same information written on them. The second mode of encoding operation includes the encoding the number of the Servo Band, whereby the encoded Servo Band number information is obtained from the two bands that are read by the servo read heads, but such encoding/decoding requires different information to be written on different Servo Bands, even if they have the same address.

Figure 7A:
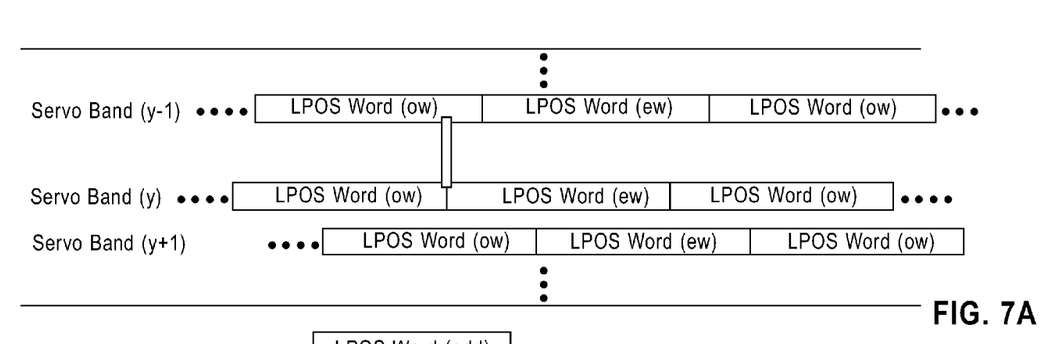
FIG. 7a is a schematic representation of an LPOS word that highlights the mode of operation where no Servo Band number information is encoded into the LPOS words.

FIG. 7a highlights the mode of operation where no Servo Band number information is encoded into the LPOS word. The LPOS words are arranged as shown, where "ow" designates an odd LPOS word, and "ew" designates an even LPOS word. FIG. 7a shows:

Servo Band (y−1): ow . . . ew . . . ow . . . ew . . . etc.
Servo Band (y): ow . . . ew . . . ow . . . ew . . . etc.
Servo Band (y+1): ow . . . ew . . . ow . . . ew . . . etc.
Etc.

Figure 7B:
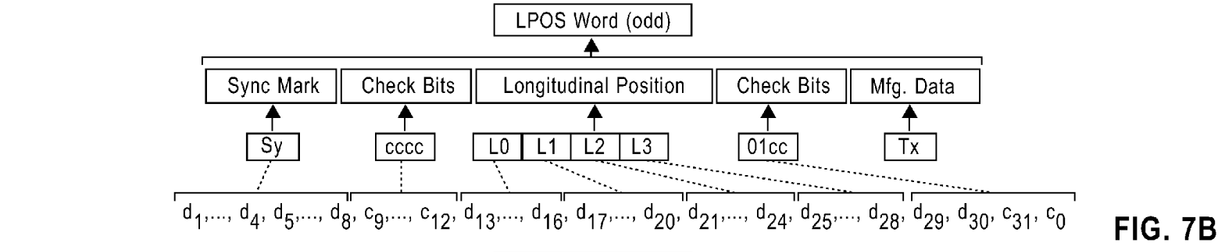
FIG. 7b is a schematic representation of information of an odd LPOS word w/o servo information encoded.
Figure 7C:
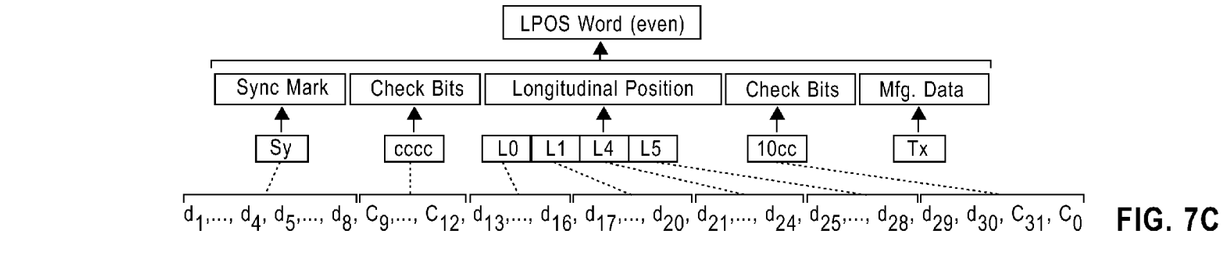
FIG. 7c is a schematic representation of information of an even LPOS word w/o servo information encoded.

The information on the odd and even LPOS words ($d_1, \ldots, d_8, c_9, \ldots, c_{12}, d_{13}, \ldots, d_{30}, c_{31}, c_0$, Tx), is found in FIGS. 7b and 7c, respectively. That is, the odd LPOS word is shown in FIG. 7b as:

ow: 10000000 cccc L0 L1 L2 L3 01cc Tx;

and the even LPOS word is shown in FIG. 7c as:

ew: 10000000 cccc L0 L1 L4 L5 10cc Tx.

The check bits are chosen so that the first 32 bits (that is, excluding the Tx) is a "coded" LPOS word. And as stated, two consecutive LPOS word are required to determine the exact address (that is to retrieve L0, L1, L2, L3, L4, and L5). Bits $d_{29}$ and $d_{30}$ are used to differentiate between odd and even LPOS words.

Figure 8A:
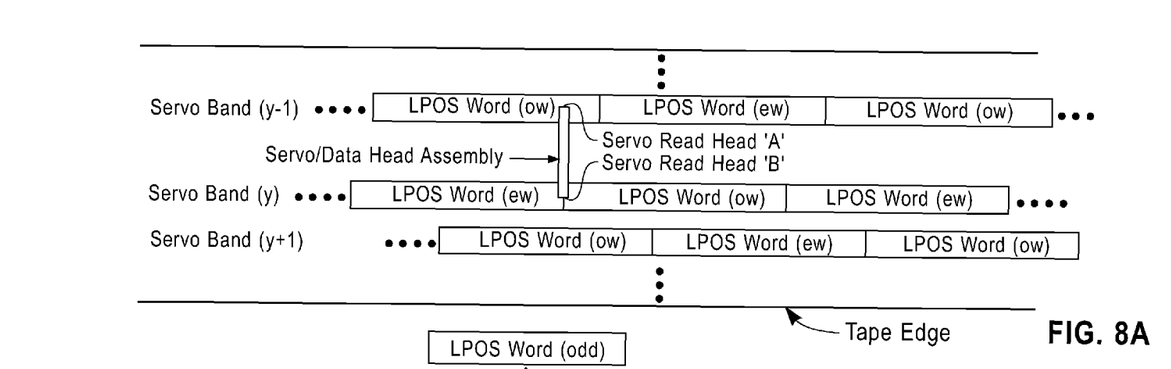
FIG. 8a is a schematic representation of an LPOS word that highlights the second mode of operation, where Servo Band number information is included in the "coded" LPOS words.

FIG. 8a highlights the second mode of operation, where Servo Band number information is included in the "coded" LPOS words. The LPOS words are arranged as follows:

Servo Band (y−1): ow . . . ew . . . ow . . . ew . . . etc.
Servo Band (y): ew . . . ow . . . ew . . . ow . . . etc.
Servo Band (y+1): ow . . . ew . . . ow . . . ew . . . etc.
Etc.

Figure 8B:
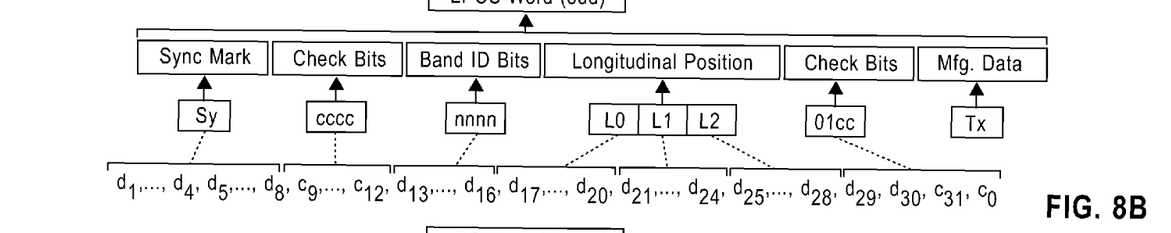
FIG. 8b is a schematic representation of information of an odd LPOS word with servo information encoded.
Figure 8C:
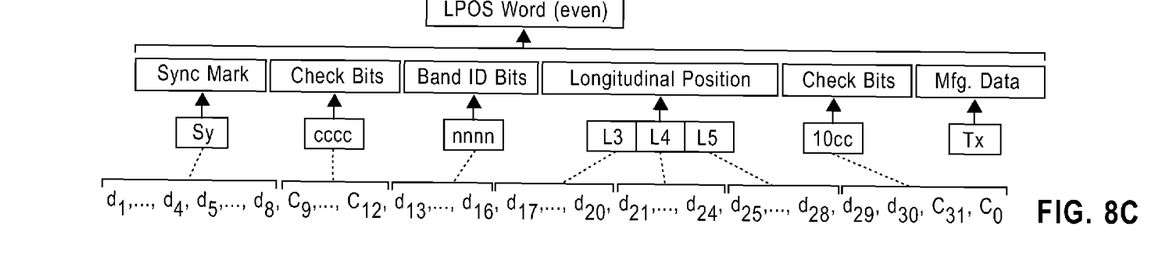
FIG. 8c is a schematic representation of information of an even LPOS word with servo information encoded.

The information on the odd and even LPOS words ($d_1, \ldots, d_8, c_9, \ldots, c_{12}, d_{13}, \ldots, d_{30}, c_{31}, c_0$, Tx), is found in FIGS. 8b and 8c, respectively. That is, the odd LPOS word is shown in FIG. 8b as:

ow: 10000000 cccc nnnn L0 L1 L2 01cc Tx;

and the even LPOS word is shown in FIG. 8c as:

ew: 10000000 cccc nnnn L3 L4 L5 10cc Tx

The check bits are chosen so that the first 32 bits (that is excluding the Tx) is a "coded" LPOS word.

The symbol nnnn is the information on the number of the band. The symbol nnnn may comprise only one of 14 values. In an operational case where there exist more than 14 bands, for example, where there are 17 bands, then the numbering of the bands is: 1, 2, 3, 4, 5, 6, 7, 8, 9, 10, 11, 12, 13, 14, 3, 2, 1.

In an operational case where both servo heads are working, the longitudinal position (L0 through L5) is readily decoded from the information read, and the Servo Band number is disambiguated by processing both values. That is, if the value to the left of 3 is 2, or, if the value to its right is 4, then the Servo Band number is 3. But if the value to the left of 3 is 14, or if the value to its right of 3 is 2, then the Servo Band number is 15. Similarly, the invention disambiguates between Servo Bands numbers 2 and 16, and between Servo Bands numbers 1 and 17.

In an operational case where one servo read head has failed, information is decoded from (using) only one servo read head, two consecutive LPOS words (ow+ew) must be read (decoded) within the same Servo Band to obtain the required positional information. In this operational case, however, there must be sufficient information about the number of the Servo Band (when there are more than 14 Servo Bands) to support disambiguating between the Servo Bands, which have the same number.

When the number of Servo Bands is larger than 14, an alternative approach is implemented in accordance with the invention. That is, if there are greater than 14 Servo Bands on a particular tape, the number of the Servo Band (in base 14) is written or encoded as NNNN nnnn. This allows for up to $14^2$, or 196 Servo Bands. In such case, the information about the Servo Band number is split, or encoded, between the odd and even LPOS words. That is:

ow: 10000000 cccc nnnn L0 L1 L2 01cc Tx; and
ew: 10000000 cccc NNNN L3 L4 L5 10cc Tx.

As already described, the number of the Servo Band is derived by reading an odd and an even LPOS word, either simultaneously (when we use two heads) or consecutively (when only one head is working).

For some tape products, "the identity of servo band y is determined by the relative positions down the tape of frames in servo bands y, y−1, and y+1, reading the top and bottom servo elements, respectively," as stated within: Ultrium Generation 3, 16-Channel Format Specification Document U-316, Revision D, Aug. 16, 2005. Such identification format feature is represented in FIGS. 5, 7a, and 8a. However, the extendibility of this encoding method may be an issue in the future due to the frame offset requirement.

Figure 9:
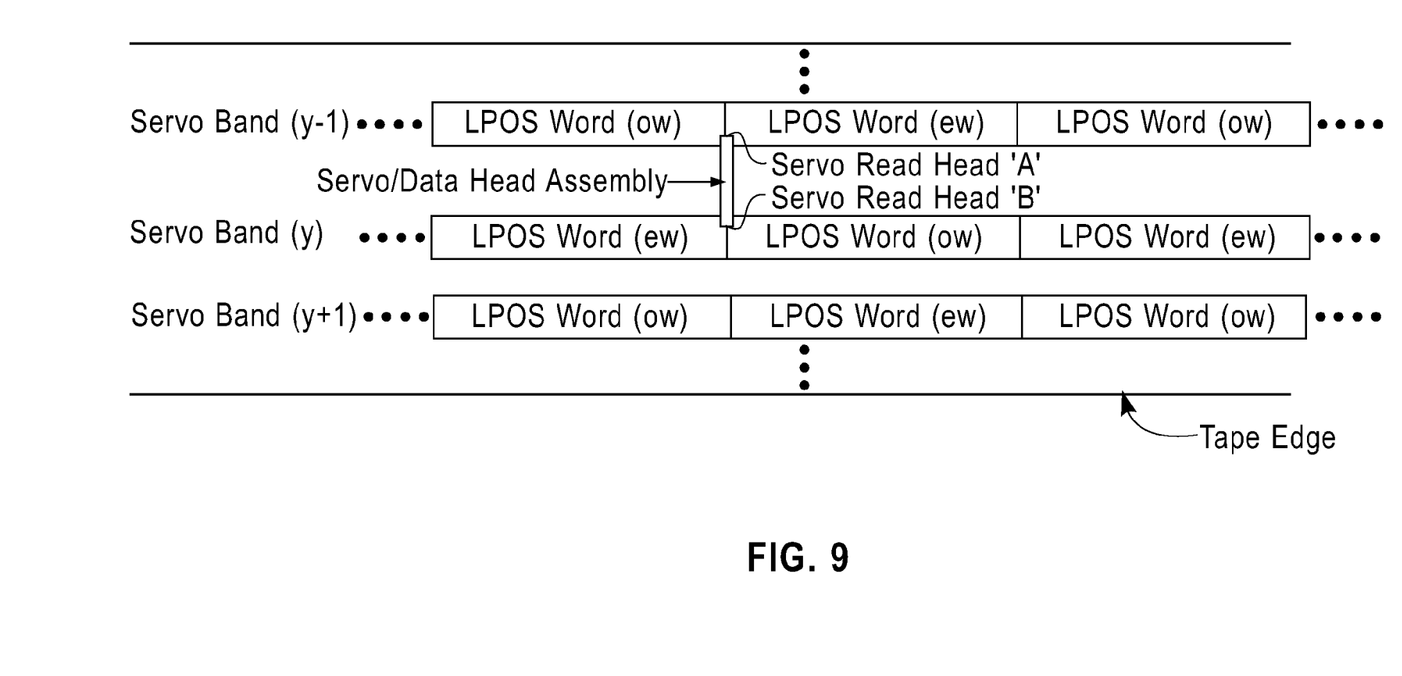
FIG. 9 herein shows servo band alignment in accordance with the invention that eliminates the servo read delay between servo bands (using 2 servo heads).

Aligning the servo bands as shown in FIG. 9 herein, eliminates the servo read delay between servo bands (using 2 servo heads), thereby improving servo system performance, and simplifying the servo writing of the tape. As mentioned, by writing the novel LPOS words in the odd and even arrangements shown herein obviate the need to prime the LPOS decoder circuitry.

The following table summarizes the several cases of inventive operation by use of the LPOS words with error correcting capability (W/ECC), for the cases where the LPOS words include band ID (W/Band ID), and the cases where the LPOS words do not include band ID (W/O Band ID).

TABLE

| Case 1 | | | |
|---|---|---|---|
| Band 0, W/ECC, W/O Band ID | ODD LPOS | EVEN LPOS | ODD LPOS |
| Band 1, W/ECC, W/O Band ID | ODD LPOS | EVEN LPOS | EVEN LPOS |
| Case 2 | | | |
| Band 0, W/ECC, W/Band ID | ODD LPOS | EVEN LPOS | ODD LPOS |
| Band 1, W/ECC, W/Band ID | ODD LPOS | EVEN LPOS | ODD LPOS |
| Case 3 | | | |
| Band 0, W/ECC, W/O Band ID | ODD LPOS | EVEN LPOS | ODD LPOS |
| Band 1, W/ECC, W/O Band ID | EVEN LPOS | ODD LPOS | EVEN LPOS |
| Case 4 | | | |
| Band 0, W/ECC, W/Band ID | ODD LPOS | EVEN LPOS | ODD LPOS |
| Band 1, W/ECC, W/Band ID | EVEN LPOS | ODD LPOS | EVEN LPOS |

Although a few examples of the present invention have been shown and described, it would be appreciated by those skilled in the art that changes might be made in these embodiments without departing from the principles and spirit of the invention, the scope of which is defined in the claims and their equivalents.

What is claimed is:

1. A linear tape open (LTO) storage tape comprising odd and even 36-bit longitudinal position (LPOS) words for identifying and correcting erroneous and ambiguous bit errors, said odd and even LPOS words arranged and encoded on the LTO storage tape with tape position information without increasing the 36-bit length of the coded word, each said encoded LPOS word including 26 information bits and 6 parity bits,
   wherein said tape position information encoded into the LPOS words on the LTO storage tape enables efficient decoding of address information by reading two of the coded LPOS words wherein: 1) the coded LPOS words are positioned sequentially in a servo band and without a servo band number and are read sequentially, or 2) the coded LPOS words are positioned in separate servo bands, with servo band number and read simultaneously; and
   single erroneous bit errors present in the LPOS words are detectable and correctable.

2. The linear tape open (LTO) storage tape as set forth in claim 1, wherein two erroneous bit errors in said LPOS words are detectable.

3. The linear tape open (LTO) storage tape as set forth in claim 1, wherein ambiguous bits in said LPOS words are determinable.

4. The linear tape open (LTO) storage tape as set forth in claim 1, wherein six (6) 4-bit (bbbb) symbol fields L0, L1, L2, L3, L4, and L5 designate an address location, said odd LPOS word is arranged in an order as follows:
   10000000cccc L0 L1 L2 L3 01cc Tx,
where 10000000 is a fixed bit sequence sync mark field, cccc represent parity bits $c_9$, $c_{10}$, $c_{11}$ and $c_{12}$, and 01cc include parity bits $c_{31}$, $c_0$ and Tx is a 4-bit (bbbb) manufacturer's field, and said even LPOS word is arranged in an order as follows:
   10000000cccc L0 L1 L4 L5 10cc Tx,
where 10000000 is a fixed bit sequence sync mark field, cccc represent parity bits $c_9$, $c_{10}$, $c_{11}$ and $c_{12}$, and 10cc include parity bits $c_{31}$, $c_0$ and Tx is a 4-bit (bbbb) manufacturer's field.

5. The linear tape open (LTO) storage tape as set forth in claim 4, wherein the values of the six parity bits are computed by first computing two pseudo syndromes, $S'_0$ and $S'_1$, where $S'_0 = \tilde{\sim} d_i$, and $S'_1 = \tilde{\sim} i^* d_i$, where $\tilde{\sim}$ refers to an XOR operation, $d_i$ refers to the information bits, and "i" refers to the position of the information bit, and a 'summation' is carried out only over the information bits.

6. The linear tape open (LTO) storage tape as set forth in claim 5, wherein the six parity bits are computed as:

$c_9 = S'_1(1) \tilde{\sim} S'_1(2) \tilde{\sim} S'_1(3) \tilde{\sim} S'_1(4)$ $c_{10} = S'_1(0) \tilde{\sim} S'_1(2) \tilde{\sim} S'_1(3) \tilde{\sim} S'_1(4)$ $c_{11} = S'_1(0) \tilde{\sim} S'_1(1) \tilde{\sim} S'_1(2) \tilde{\sim} S'_1(3)$ $c_{12} = S'_1(2) \tilde{\sim} S'_1(4)$ $c_{31} = S'_1(4)$ and $c_0 = S'_0 \tilde{\sim} S'_1(3)$ where (0),(1), . . . (4), represent bit positions within a 5 bit pseudo syndrome.

7. The linear tape open (LTO) storage tape as set forth in claim 1, wherein the LPOS words are encoded as servo burst patterns.

8. A magnetic tape storage system for storing and retrieving digital data in a form of 36-bit longitudinal position (LPOS) words with error correcting function positioned on a linear tape open (LTO) magnetic storage tape, wherein said LPOS words with error correcting function are arranged on the magnetic storage tape in servo bands and encoded with tape positional information, said tape storage system comprising:
 an encoder for encoding the positional information into a 32-bit LPOS word having 26 information bits and 6 parity bits;
 a tape reader-writer, for writing the encoded LPOS words to the tape, and reading the encoded LPOS words from the tape during tape storage system operation; and
 a decoder for decoding the 26 information bits and 6 parity bits from LPOS words read from the tape, the decoder identifying one of: a location of single bit error, double bit error and ambiguous bits therein;
 wherein each LPOS word is encoded as even or odd to support the error correcting function,
 wherein said decoder decodes address information from said odd and even LPOS words by one of:
 reading the encoded LPOS words in two servo bands simultaneously if the even and odd LPOS words are encoded to include a servo band number, or
 reading two successive encoded LPOS words in a servo band if the even and odd LPOS words are encoded without servo band number.

9. The magnetic tape storage system as set forth in claim 8, wherein six (6) 4-bit (bbbb) symbol fields L0, L1, L2, L3, L4, and L5 designate an address location, said odd LPOS word is arranged in an order as follows:
 10000000cccc L0 L1 L2 L3 01cc Tx,
where 10000000 is a fixed bit sequence sync mark field, cccc represent parity bits $c_9$, $c_{10}$, $c_{11}$ and $c_{12}$, and 01cc include parity bits $c_{31}$, $c_0$ and Tx is a 4-bit (bbbb) manufacturer's field, and said even LPOS word is arranged in an order as follows:
 10000000cccc L0 L1 L4 L5 10cc Tx,
where 10000000 is a fixed bit sequence sync mark field, cccc represent parity bits $c_9$, $c_{10}$, $c_{11}$ and $c_{12}$, and 10cc include parity bits $c_{31}$, $c_0$ and Tx is a 4-bit (bbbb) manufacturer's field.

10. The magnetic tape storage system as set forth in claim 9, wherein if the even and odd LPOS words include the servo band number, each LPOS word encoded in each of servo bands and read simultaneously must be different, even where said simultaneously read LPOS words have the same address encoded therein.

11. The magnetic tape storage system as set forth in claim 9, wherein the six parity bits are computed by computing two pseudo syndromes, $S'_0$ and $S'_1$, where $S'_0 = \tilde{\sim} d_i$, and $S'_1 = \tilde{\sim} i * d_i$, where $\tilde{\sim}$ refers to an XOR operation, $d_i$ refers to the information bits, and "i" refers to the position of the information bit, and a 'summation' is carried out only over the information bits.

12. The magnetic tape storage system as set forth in claim 11, wherein the six parity bits are computed as:

$c_9 = S'_1(1) \tilde{\sim} S'_1(2) \tilde{\sim} S'_1(3) \tilde{\sim} S'_1(4)$ $c_{10} = S'_1(0) \tilde{\sim} S'_1(2) \tilde{\sim} S'_1(3) \tilde{\sim} S'_1(4)$ $c_{11} = S'_1(0) \tilde{\sim} S'_1(1) \tilde{\sim} S'_1(2) \tilde{\sim} S'_1(3)$ $c_{12} = S'_1(2) \tilde{\sim} S'_1(4)$ $c_{31} = S'_1(4)$ and $c_0 = S'_0 \tilde{\sim} S'_1(3)$ where (0),(1), ... (4), represent bit positions within a 5 bit pseudo syndrome.

13. The magnetic tape storage system as set forth in claim 8, wherein the LPOS words are encoded as servo burst patterns.

14. The magnetic tape storage system as set forth in claim 8, wherein the decoder corrects single bit error and renders ambiguous bits determinable.

15. A method for longitudinal position (LPOS) detection in a magnetic tape storage system for storing data upon linear tape open (LTO) magnetic storage tape, which data includes odd and even LPOS words with error correcting function, the method comprising the steps of:
 encoding positional information onto the magnetic storage tape within the odd and even LPOS words, each word including a 32-bit LPOS word having 26 information bits and 6 parity bits;
 operating the magnetic tape storage system by passing the LTO magnetic storage tape encoded with the odd and even LPOS words with error correcting function longitudinally across a servo reader/writer at a known speed;
 decoding the encoded positional information by reading either two words sequentially or two words simultaneously, wherein said simultaneous reading requires that said LPOS words include servo band numbers; and
 detecting and correcting one or both ambiguous bits and single erroneous bit errors.

16. The method as set forth in claim 15, wherein the step of detecting and correcting includes detecting multiple bit errors.

17. The method as set forth in claim 15, wherein six (6) 4-bit (bbbb) symbol fields L0, L1, L2, L3, L4, and L5 designate an address location, said odd LPOS word is arranged in an order as follows:
 10000000cccc L0 L1 L2 L3 01cc Tx,
where 10000000 is a fixed bit sequence sync mark field, cccc represent parity bits $c_9$, $c_{10}$, $c_{11}$ and $c_{12}$, and 01cc include parity bits $c_{31}$, $c_0$ and Tx is a 4-bit (bbbb) manufacturer's field, and said even LPOS word is arranged in an order as follows:
 10000000cccc L0 L1 L4 L5 10cc Tx,
where 10000000 is a fixed bit sequence sync mark field, cccc represent parity bits $c_9$, $c_{10}$, $c_{11}$ and $c_{12}$, and 10cc include parity bits $c_{31}$, $c_0$ and Tx is a 4-bit (bbbb) manufacturer's field.

18. The method as set forth in claim 17, wherein said decoding comprises:
 computing the values of the six parity bits by first computing two pseudo syndromes, $S'_0$ and $S'_1$, where $S'_0 = \tilde{\sim} d_i$, and $S'_1 = \tilde{\sim} i * d_i$, where $\tilde{\sim}$ refers to an XOR operation, $d_i$ refers to the information bits, and "i" refers to the position of the information bit, and a 'summation' is carried out only over the information bits.

19. The method as set forth in claim 18, wherein the six parity bits are computed as:

$c_9 = S'_1(1) \tilde{\sim} S'_1(2) \tilde{\sim} S'_1(3) \tilde{\sim} S'_1(4)$ $c_{10} = S'_1(0) \tilde{\sim} S'_1(2) \tilde{\sim} S'_1(3) \tilde{\sim} S'_1(4)$ $c_{11} = S'_1(0) \tilde{\sim} S'_1(1) \tilde{\sim} S'_1(2) \tilde{\sim} S'_1(3)$ $c_{12} = S'_1(2) \tilde{\sim} S'_1(4)$ $c_{31} = S'_1(4)$ and $c_0 = S'_0 \tilde{\sim} S'_1(3)$ where (0),(1), ... (4), represent bit positions within a 5 bit pseudo syndrome.

* * * * *